No. 758,223. PATENTED APR. 26, 1904.
R. THIRSK.
MEASURING AND CUTTING OFF MACHINE.
APPLICATION FILED JAN. 28, 1904.
NO MODEL.
Fig. 1.
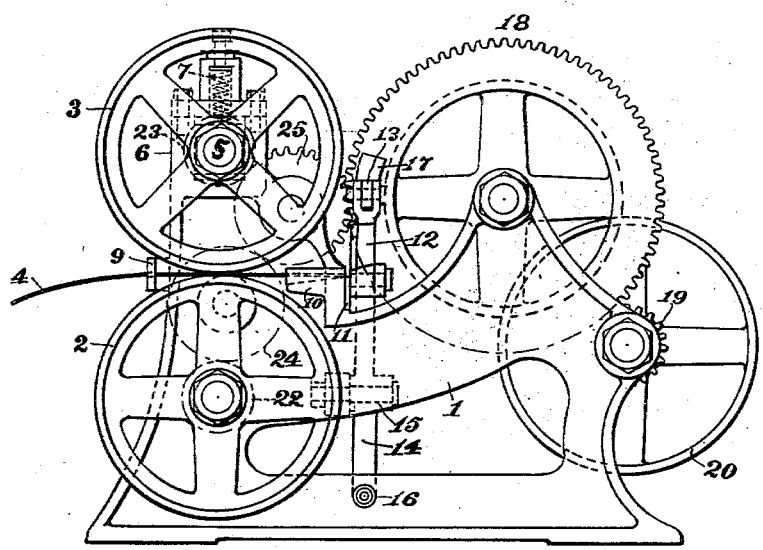
Fig. 2.
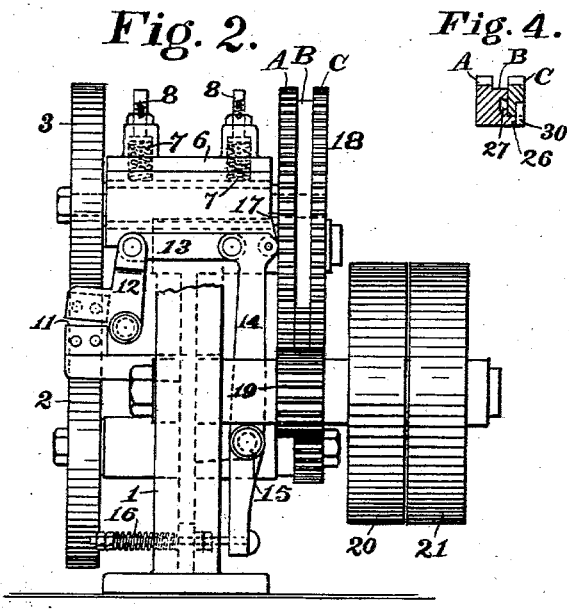
Fig. 3.
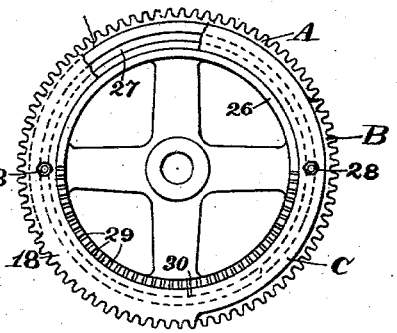
Fig. 4.
WITNESSES:
INVENTOR
Richard Thirsk.
BY
Henry L. Reynolds.
ATTORNEY No. 758,223. Patented April 26, 1904.

UNITED STATES PATENT OFFICE.

RICHARD THIRSK, OF CORDOVA, ALABAMA.

MEASURING AND CUTTING-OFF MACHINE.

SPECIFICATION forming part of Letters Patent No. 758,223, dated April 26, 1904.

Application filed January 28, 1904. Serial No. 190,972. (No model.)

*To all whom it may concern:*

Be it known that I, RICHARD THIRSK, a citizen of the United States, and a resident of Cordova, Alabama, have invented certain new and useful Improvements in Measuring and Cutting-Off Machines, of which the following is a specification.

My invention relates to an improvement in measuring and cutting-off machines and will be hereinafter defined in the claims terminating this specification.

The object of my invention is to improve and simplify the construction and operation of such devices.

In the drawings forming a part of this specification I have illustrated my invention embodied in the form which is now preferred by me.

Figure 1 is a side elevation of my machine from the cutting side. Fig. 2 is an end elevation of the machine from the right side, a portion of the frame being broken away to better show the cutter-operating mechanism. Fig. 3 is a side view of the measuring-wheel, a portion being broken away; and Fig. 4 is a cross-section through the rim of the measuring-wheel.

My invention is applicable to machines intended for measuring and cutting off materials of widely-varying characters and kinds. I have herein illustrated it as embodying in a machine for measuring and cutting off strips or bands of metal—such, for instance, as would be adapted to form hoops or binding-strips for bales and packages of various kinds. I am, however, well aware that it may be used to measure and cut wire, rods, and, in fact, any kind of material which comes in pieces which are of sufficient length relatively to the pieces cut to make the use of an automatic device desirable, whether the material be metal, wood, fabric, or otherwise.

The following is a description of my invention as herein illustrated:

Feed-rolls 2 3 are journaled in the frame 1, so that their peripheries may contact. These should be separable to such an extent as to permit passage of the material to be measured and cut between them. I have herein secured this result by mounting the shaft 5 of the upper feed-roller 3 in guides 6, which will permit a slight rise and fall. A sufficient feeding grip upon the material may be secured either by the weight of the upper wheel and parts connected thereto or by the use of springs, or by both means. I have herein shown springs 7 as assisting the weight of the feed roll or wheel. Tension-adjusting means—such, for instance, as screws 8—may be employed. The strip 4 is led through guides 9 10 to the cutting-off device, the same, as herein shown, consisting of a shear-blade 11 and a movable blade, the latter being carried by or forming a part of the pivoted lever 12. This lever is connected by link 13 with a lever 14, which is pivoted at 15 and has its upper end normally in position to be engaged and pushed to one side by a cam projection 17 upon the measuring and driving wheel 18. From this measuring and driving wheel all the parts of the machine are operated. It may be turned by any suitable means. I have herein shown it as toothed and driven by a pinion 19 upon a shaft which also carries fast and loose belt-pulleys 20 21. The shafts of the feed wheels or rolls 2 and 3 are provided with pinions 22 23, and these are connected with each other and with the measuring and driving gear 18 by idler-gears 24 25. In some cases one of the feed-rolls might be an idler—that is, not be positively driven—in which case some of these gears would be omitted.

The measuring and driving gear 18 is of a peculiar construction. By referring to Figs. 3 and 4 it will be seen that its face is composed of three toothed sections or bands A B C. The section A is a complete gear—that is, the teeth extend entirely around the gear. This section of the gear does not mesh with the gear-train by which the feed-rolls are turned. In case gear 18 is driven by other means than by a pinion or gear this section A may be entirely omitted. The other two sections, B and C, are interrupted gears, the toothed portions preferably extending about half-way around each. Both these sections mesh with the gear-train, which drives the feed-rolls, and all sections may mesh with the driving-pinion 19. The section B is preferably integral with the section A; but section C is separate therefrom and is secured to the main wheel in such manner that it may be adjusted angularly with relation thereto. By proper adjustment of these two sections the interrupted portion of the composite gear may be adjusted from about half the periphery to as small an amount as will produce sufficient dwell in the feeding mechanism to permit proper operation of the cut-off mechanism. The teeth of the different sections are of course spaced and cut as a single wheel, so that they will match when shifted. The means herein adopted for securing this adjustability is shown in Figs. 3 and 4. The section C consists only of a ring, which fits over a flange 26 on the wheel, being thereby properly centered and supported. The rim of wheel 18 has a dovetailed or undercut channel 27 in its side face, which receives securing-bolts 28. These bolts are, however, not relied upon to take the torque, and therefore but few need be used. I have shown but two. The flange 26 has a series of channels or grooves 29 cut across its face and spaced to correspond with the spacing of the gear-teeth. The ring C has a steel key 30, which fits in these grooves. The adjustment of the ring is therefore a very simple matter, quickly and accurately performed, and not requiring special skill. The length of band cut will correspond with—that is, be proportionate to—the periphery of the wheel covered by the combined toothed portions of sections B and C. Where the pinions on the shaft of the feed-rolls are smaller than the rolls, the length cut will be a multiple of the this peripheral distance. The variations in lengths cut will be by a corresponding multiple of the tooth-spacing of this wheel.

It is evident that many of the details of this machine may be varied from that shown and yet not change the essential character of the device. I do not, therefore, limit my invention to the mechanisms herein shown, as I am aware of many variations which may be made thereupon. I do, however, claim any machine the construction of which falls within the terms of the following claims.

What I claim is—

1. In a measuring and cutting-off machine, in combination, feed-rolls, positive driving means therefor adapted to produce a dwell in the feed-rolls once during each cycle of operations, a cutter and means for operating it once during each cycle, and means for varying the proportions of the feeding movement and dwell of the feed-rolls.

2. In a measuring and cutting-off machine, in combination, means for feeding and means for cutting off the material, and means for actuating said mechanisms comprising an interrupted gear, and means for varying the proportions of the blank and toothed sectors thereof.

3. In a measuring and cutting-off machine, in combination, means for feeding and means for cutting off the material, and means for actuating said mechanisms comprising a member provided with means for actuating the feeding mechanism for a certain portion of its cycle, and means for actuating the cutting-off mechanism during the remainder of its cycle, and means for varying the proportion of said cycle during which the feed mechanism is actuated.

4. In a measuring and cutting-off machine, in combination, a cutter and means for operating it, feed-rolls, driving mechanism for said rolls comprising an interrupted gear having its face divided into two parts adjustable angularly upon each other to vary the proportions of toothed and blank sectors.

5. In a measuring and cutting-off machine, in combination, a cutter and means for operating it, feed-rolls, driving mechanism for said rolls comprising a gear having its face divided into a continuous section and an interrupted section, said interrupted section only, engaging the feed-roll-driving gears, and a driving-gear therefor engaging the continuous section.

6. In a measuring and cutting-off mechanism, in combination, a cutting-off mechanism, means for operating the same, feed-rolls, and driving mechanism for said feed-rolls comprising a gear-wheel having its face divided into a continuously-toothed section and two sections having interrupted sectors, said interrupted sections only, acting upon the feed-roll-driving mechanism, and one of said interrupted gear-sections comprising a ring adjustable angularly upon the other section.

7. In a measuring and cutting-off machine, in combination, feed-rolls, means for holding said rolls in yielding contact with the material being cut, guides for said material before and after it passes between the feed-rolls, a cutting-off device adjacent the latter of said guides, a measuring and driving gear connected with the feed-rolls to drive them, said gear having an interrupted sector adapted to produce a dwell in the feed-rolls, and also having a side face cam adapted to actuate the cutting-off mechanism during said dwell.

8. In a measuring and cutting-off machine, in combination, feed-rolls, means for holding said rolls in yielding contact with the material being cut, guides for said material before and after it passes between the feed-rolls, a cutting-off device adjacent the latter of said guides, a measuring and driving gear connected with the feed-rolls to drive them, said gear having an interrupted sector adjustable in amount and adapted to produce a dwell in the feed-rolls, and also having a side face cam adapted to actuate the cutting-off mechanism during said dwell.

In testimony whereof I have hereunto affixed my signature, this 12th day of January, 1904, in the presence of two witnesses.

RICHARD THIRSK.

Witnesses:
SCOTT MAXWELL,
J. H. CRAIG.